United States Patent
Takeda et al.

(10) Patent No.: US 6,380,488 B1
(45) Date of Patent: Apr. 30, 2002

(54) CABLE PROTECTOR WITH MAIN AND AUXILIARY HOLDING PORTIONS

(75) Inventors: Ikuo Takeda; Kenji Yamazaki, both of Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/653,351

(22) Filed: Aug. 31, 2000

(30) Foreign Application Priority Data

Sep. 6, 1999 (JP) .......................................... 11-251955

(51) Int. Cl.$^7$ ................................................. H01B 7/18
(52) U.S. Cl. ............................ 174/135; 174/95; 174/97; 191/22 R; 191/30
(58) Field of Search ............................ 174/70 A, 72 A, 174/71 R, 72 R, 72 TR, 68.1, 68.3, 95, 97, 101, 65 R; 191/22 R, 30

(56) References Cited

U.S. PATENT DOCUMENTS

| | | | |
|---|---|---|---|
| 3,622,686 A | * 11/1971 | Neirinck ...................... | 174/97 |
| 4,744,010 A | * 5/1988 | Witte ......................... | 367/417 |
| 5,205,635 A | * 4/1993 | Van Order et al. ......... | 362/83.1 |
| 5,668,351 A | * 9/1997 | Hanlon et al. ............. | 174/68.3 |
| 5,739,470 A | * 4/1998 | Takeda ....................... | 174/97 |
| 5,952,616 A | * 9/1999 | Morrow ...................... | 174/135 |
| 6,229,091 B1 | * 5/2001 | Ogawa et al. .............. | 174/72 A |
| 6,268,566 B1 | * 7/2001 | Takiguchi et al. ......... | 174/72 A |

* cited by examiner

Primary Examiner—Dean A. Reichard
Assistant Examiner—Adolfo Nino
(74) Attorney, Agent, or Firm—Morgan, Lewis & Bockius LLP

(57) ABSTRACT

A cable protector that includes a main portion for holding a first cable having a relatively large diameter size and an auxiliary portion formed adjacently to the main portion for holding a plurality of second cables each having a relatively small diameter size side by side in the vertical direction. The auxiliary portion is composed of a plurality of hold stays each having an L-shaped section and formed at proper intervals on the outer surface of the side wall forming the main portion in such a manner that the hold stays extend along the longitudinal direction of the protector main body. In the auxiliary portion, on the outer surface of the side wall, a plurality of removal preventive projections are arranged at a cross-stitch stage pitch between the plurality of hold stays. One second cable can be held in a three-point-support manner or a in a bolt manner, which can prevent the only one second cable from trashing in the protector main body due to vibrations.

2 Claims, 3 Drawing Sheets

CABLE PROTECTOR WITH MAIN AND AUXILIARY HOLDING PORTIONS

BACKGROUND OF THE INVENTION

1. Field of the Invention

The present invention relates to a cable protector which protects pipes including a washer hose, electric wires and cables, and combined wires, namely, wire harnesses especially wired in a car (which are generically called cables hereinafter) against wear due to friction with respect to the body of the car.

2. Related Art

FIG. 5 is a partially sectional side view of a conventional cable protector which holds therein different kinds of cables 3, 5 differing in uses and diameter sizes, and FIG. 6 is a perspective view of a protector main body 1 itself employed in the conventional cable protector.

The protector main body 1 includes a gutter-shaped main portion 2 which has a U-shaped section and has two side walls 1a on the two side thereof and, in the main portion 2, there is held a cable 3 which has a relatively large diameter size and is shown by a virtual line in FIG. 5. Also, on the outer surface of one side wall 1a of the main portion 2, there is disposed a hold stay 1b having an L-shaped section; and, a space defined by the side surface wall 1a and hold stay 1b is used as an auxiliary portion 4 into which a plurality of (in this case, two) cables 5 each having a relatively small diameter size can be packed one by one from above and held side by side in the vertical direction.

In the adjacent portions of the cable storing opening that is located at the upper end of the auxiliary portion 4, more specifically, on the two inside portions of the cable storing opening, there are opposingly disposed two semicylindrical-shaped removal preventive projections 6 each having a semicircular section; that is, the cable 5 stored in the upper stage is pressed from above by these removal preventive projections 6 to thereby prevent the cables 5 from being removed from the cable storing opening.

By the way, in the conventional cable protector shown in FIGS. 5 and 6, in case where a given number of cables 5, namely, two cables 5 are held in the auxiliary portion 4, the two removal preventive projections 6 are surely able to press against the cable 5 held at an upper stage. Therefore, the conventional cable protector is effective in preventing the cables 5 against removal.

However, as shown in FIG. 7, in case where the number of cables 5 stored is small, that is, only one cable 5 is held in the auxiliary portion 4, there is produced a vacant space in the interior portion of the auxiliary portion 4 and thus the single cable 5 is easy to play, so that the removal preventive projections 6 do not operate effectively. Due to this, there is produced an inconvenience that the single cable 5 can thrash about in the auxiliary portion 4, resulting in the generation of a strange sound.

SUMMARY OF THE INVENTION

The present invention aims at eliminating the drawbacks found in the above-mentioned conventional cable protector. Accordingly, it is an object of the invention to provide a cable protector which holds electric wires cables as well as wire harnesses especially wired in a car to protect them against wear caused by friction with respect to the car body, provided in that the electric wires and cables can be prevented from thrashing about in the protector main body to thereby be able to prevent the generation of a strange sound.

In attaining the above object, according to a first aspect of the invention, there is provided a cable protector comprising a protector main body composed of a main portion for holding a first cable and an auxiliary portion formed adjacently to the main portion for holding a plurality of second cables side by side in the vertical direction, wherein the auxiliary portion is formed so as to have a storing width and a storing depth allowing the second cables to be packed one by one from a storing opening thereof and also to be held side by side in the vertical direction, and, in the direction of the storing depth, there are disposed a plurality of removal preventive projections at a stage pitch that permits the second cables to be held one by one therebetween.

Due to the above structure, in the auxiliary portion as well, which is formed adjacently to the main portion of the cable protector, the plurality of second cables are held. Since the removal preventive projections are provided at such a stage pitch that allows the second cables to be packed and held one by one, even in case where the number of second cables to be stored is only one, the only one second cable can be prevented from thrashing about in the auxiliary portion while it is held there, which makes it possible to prevent a strange sound from being produced.

Also, according to a second aspect of the invention, in a cable protector as set forth in the first aspect of the invention, a plurality of hold stays each having an L-shaped section are arranged at proper intervals on the outer portion of a side wall of the main portion so as to extend along the longitudinal direction of the protector main body, whereby the auxiliary portion is composed of the plurality of hold stays constitute, and, in the auxiliary portion, on the outer surface of the side wall, the plurality of removal preventive projections are arranged at a cross-stitch stage pitch between the plurality of hold stays.

According to the above structure, by providing the removal preventive projections at a cross-stitch stage pitch between the plurality of hold stays forming the auxiliary portion, a single second cable can be held between the hold stays in a three-point support manner or in a bolt manner, which can provide a hold force effective in preventing the thrashing motion of the second cable in the auxiliary portion. Also, in this case, in case where the auxiliary portion is composed of a plurality of continually arranged hold stays each having an L-shaped section, when compared with a case where the auxiliary portion is composed of a single hold stay along the main portion, the protector main body can be reduced in weight accordingly.

DETAILED DESCRIPTION OF PREFERRED EMBODIMENTS

Now, description will be given below in detail of an embodiment of a cable protector according to the invention with reference to the accompanying drawings.

Figure 1:
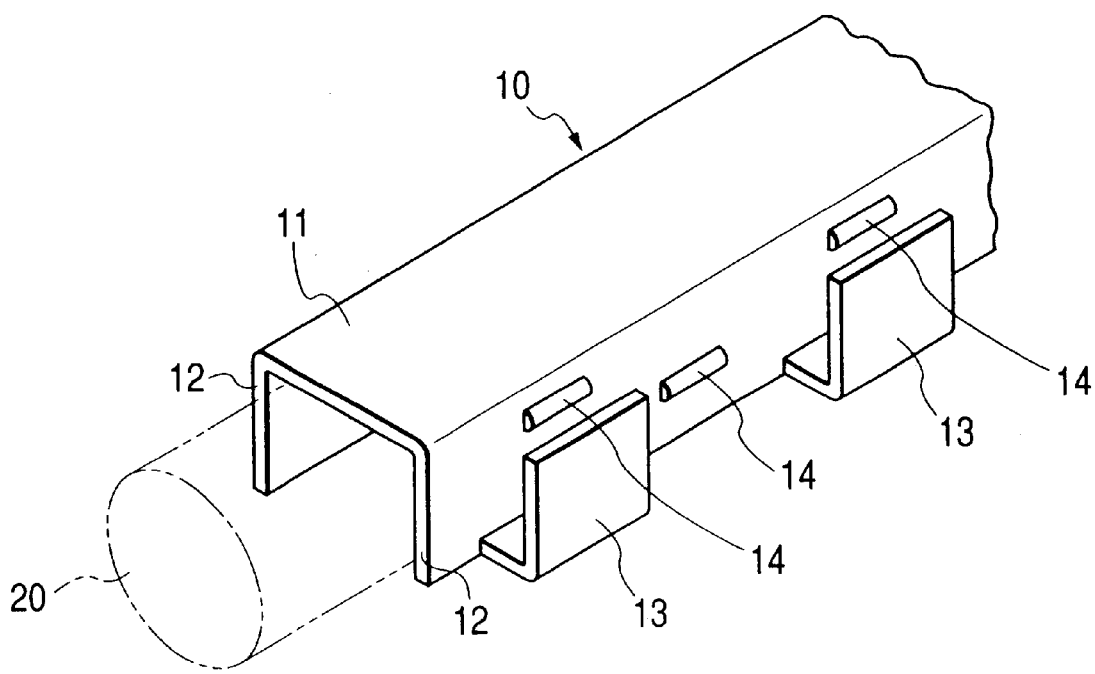
FIG. 1 is a perspective view of an embodiment of a cable protector according to the invention.
Figure 2:
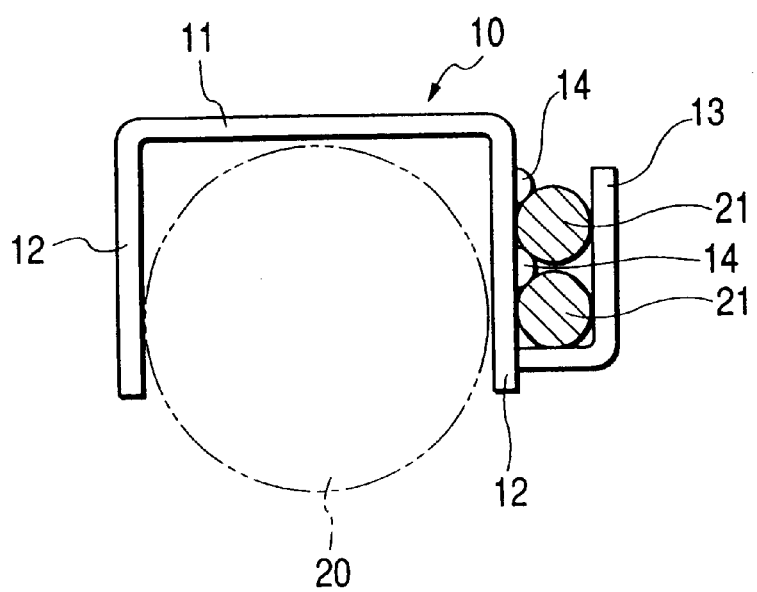
FIG. 2 is a partially sectional side view of the above embodiment, showing a state thereof in which first and second cables differing in use and size are respectively held in main and auxiliary portions formed in a protector main body.

FIG. 1 is a perspective view of an embodiment of a cable protector according to the invention, showing a state thereof in which there are held two different kinds of first and second cables 20, 21 differing in uses and diameter sizes, and FIG. 2 is a partially sectional side view of the present cable protector.

A protector main body 10 comprises a gutter-shaped main portion which is formed of resin and has a U-shaped section. Specifically, the main portion of the protector main body 10 is composed of a top plate 11 and two side walls 12 respectively disposed on the two sides of the top plate 11 so as to extend at right angles to the top plate 11; and, in the main portion, there is held the first cable 20 which has a relatively large diameter size and is shown by a virtual line in FIG. 2. Also, on the outer surface of one side wall 12 of the main portion, there are disposed a plurality of hold stays 13 each having an L-shaped section in such a manner that they extend continually in the longitudinal direction of the protector main body 10. The auxiliary portion of the protector main body 10 is composed of these hold stays 13 and, into each hold stay 13, there can be packed a plurality of (in this case, two) second cables 21 each having a relatively small diameter size from above one by one and held side by side in the vertical direction. That is, each hold stay 13 is formed so as to have a storing opening dimension, a storing width dimension and a storing depth dimension (rising length) which allow two second cables 21 to be dropped into the auxiliary portion one by one from above and to be held in the interior portion of the auxiliary portion side by side in the vertical direction.

Also, in the auxiliary portion, on the outer surface of the side wall 12, there are integrally provided a plurality of semicylindrical-shaped removal preventive projections 14 each having a semicircular section. The removal preventive projections 14 are respectively arranged in a stage pitch in the storing depth dimension which allows one second cable 21 to be held between them; and, the removal preventive projections 14 are arranged in a cross-stitch manner between the hold stays 13.

Thanks to the above structure, as shown in FIG. 2, the first cable 20 having a large diameter size is stored and protected in the gutter-shaped main portion of the protector main body 10, while a plurality of second cables 21 each having a small diameter size are stored and held in the auxiliary portion in such a manner that they extend between the hold stays 13.

In the auxiliary portion, when, as shown in FIG. 2, a given number of second cables 21, in this case, two second cables 21 are held therein, these two second cables 21 are respectively held into the interior portion of the hold stay 13 by the upper- and lower-stage removal preventive projections 14. Therefore, there is no possibility that the two second cables 21 are caused to thrash about in the hold stay 13 by the vibrations of the car body while the car is running, so that the second cables 21 can be held stably to thereby prevent the generation of a strange sound.

Figure 3:
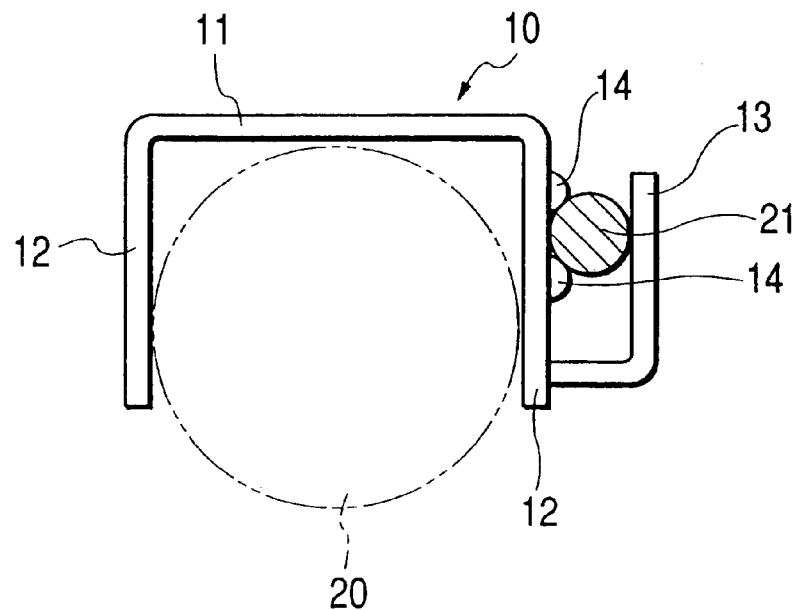
FIG. 3 is a partially sectional side view of the above embodiment, showing a state thereof in which a second cable is held in an upper stage of the auxiliary portion of the protector main body.
Figure 4:
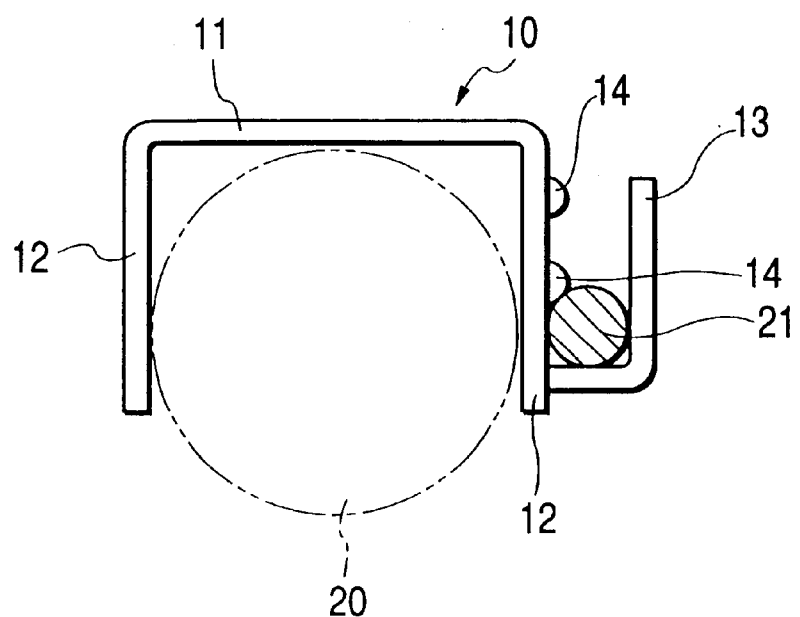
FIG. 4 is a partially sectional side view of the above embodiment, showing a state thereof in which a second cable is held in a lower stage of the auxiliary portion of the protector main body.
Figure 5:
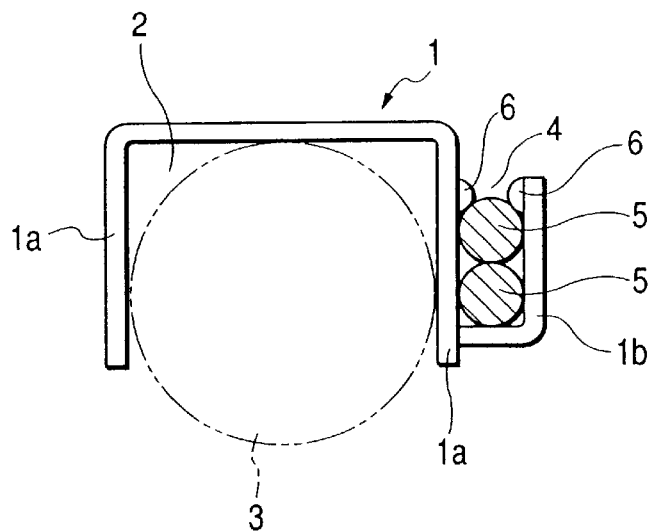
FIG. 5 is a partially sectional side view of a conventional cable protector, showing a state thereof in which cables differing in use and size are respectively held in the main and auxiliary portions thereof.
Figure 6:
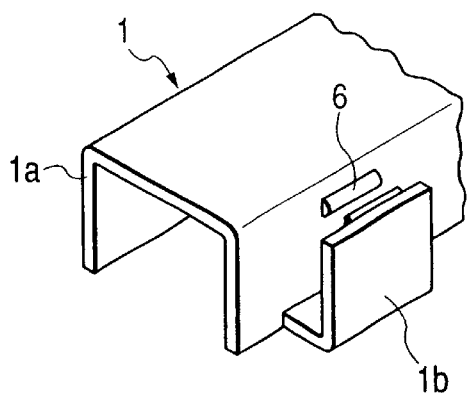
FIG. 6 is a perspective view of a protector main body of the above conventional cable protector; and, FIG. 7 is a partially sectional side view of a conventional cable protector, showing a state thereof in which a smaller number of cables than a given number of cables, that is, one cable is held in the auxiliary portion thereof.
Figure 7:
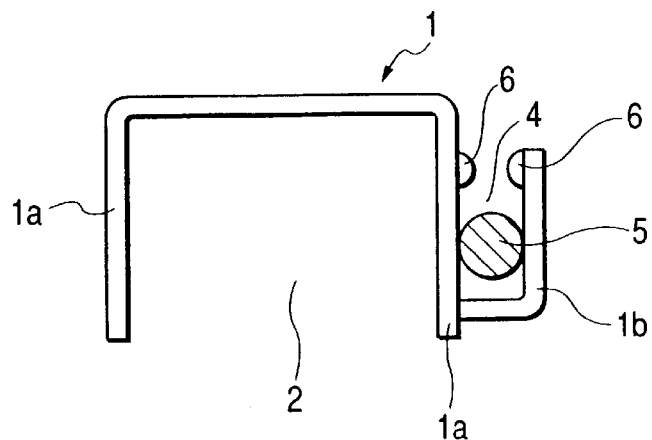

On the other hand, in the auxiliary portion, as shown in FIGS. 3 and 4, there occurs a case where only one second cable 21 is used while it is held at an upper or lower position in the interior portion of the hold stay 13. In this case, there is produced a vacant space in the cable storing portion formed in the interior portion of the hold stay 13. However, even in this case, the upper- and lower-stage removal preventive projections 14, which are arranged in a cross-stitch manner, are able to hold the second cable 21 in a three-point-support manner or in a bolt manner. Therefore, even when there exists a vacant space in the hold stay 13, there is no fear that the second cable 21 can thrash about in the auxiliary portion due to the vibrations of the car body while the car is running, thereby being able to prevent the generation of a strange sound.

By the way, in the present embodiment, as described above, as the cable to be held in the auxiliary portion, there is employed the second cable 21 having a small diameter size. In fact, in the car, there are many cases in which a washer hose is held in the hold stay 13 of the auxiliary portion. The invention is also effective in preventing the thrashing motion of the washer hose.

As has been described heretofore, in a cable protector according to the first aspect of the invention, a plurality of second cables are held in the auxiliary portion disposed adjacent to the main portion of the protector. Since the removal preventive projections are disposed at a stage pitch which permits these cables to held one by one, even when the number of second cables to be stored is only one, the only one second cable can be prevented from thrashing about within the auxiliary portion, thereby being able to prevent the generation of a strange sound.

Also, in a cable protector according to the second aspect of the invention, since a plurality of hold stays each having an L-shaped section are formed continually, when compared with a structure in which the auxiliary portion is composed of a single hold stay along the main portion, the weight of the protector main body can be reduced accordingly. Also, by arranging the removal preventive projections between the hold stays at a cross-stitch stage pitch, the single second cable can be held in a three-point-support manner or in a bolt manner, thereby being able to provide a hold force which is effective in preventing the second cable from thrashing about.

What is claimed is:
1. A cable protector comprising:
   a protector main body including a main portion for holding a first cable and an auxiliary portion, formed adjacently to said main portion, for holding a plurality of second cables in a vertical direction, said auxiliary portion formed so as to have a storing width and a storing depth direction allowing said second cables to be packed one by one from a storing opening thereof and also to be held side by side in the vertical direction; and
   a plurality of removal preventive projections disposed on the auxiliary portion in the direction of said storing depth at a stage pitch and permitting said second cables to be held one by one therebetween.

2. A cable protector as set forth in claim 1, further comprising:

said main body extending in a longitudinal direction, said main portion including a side wall with an outer portion, a plurality of hold stays each having an L-shaped section arranged at proper intervals on the outer portion of the side wall of said main portion so as to extend along the longitudinal direction of said protector main body, and said auxiliary portion defined by said plurality of hold stays, and, said plurality of removal preventive projections arranged at a cross-stitch stage pitch between said plurality of hold stays in said auxiliary portion, on the outer surface of said main wall.

* * * * *